United States Patent
Orts et al.

(10) Patent No.: US 10,435,557 B2
(45) Date of Patent: Oct. 8, 2019

(54) HIGH HEAT DEFLECTION TEMPERATURE POLYLACTIC ACIDS WITH TUNABLE FLEXIBILITY AND TOUGHNESS

(71) Applicants: The United States of America, as represented by the Secretary of Agriculture, Wahington, DC (US); Lapol LLC, Santa Barbara, CA (US)

(72) Inventors: William J. Orts, Burlingame, CA (US); Lennard F. Torres, Dublin, CA (US); Allison Flynn, El Cerrito, CA (US); William Kelly, Grand Rapids, MI (US)

(73) Assignees: The United States of America, as represented by the Secretary of Agriculture, Washington, DC (US); Lapol, LLC, Santa Barbara, CA (US)

( * ) Notice: Subject to any disclaimer, the term of this patent is extended or adjusted under 35 U.S.C. 154(b) by 0 days.

(21) Appl. No.: 15/469,204

(22) Filed: Mar. 24, 2017

(65) Prior Publication Data

US 2018/0273746 A1    Sep. 27, 2018

(51) Int. Cl.
*C08L 67/04* (2006.01)
*C08J 3/00* (2006.01)

(52) U.S. Cl.
CPC ............... *C08L 67/04* (2013.01); *C08J 3/005* (2013.01); *C08J 2367/04* (2013.01); *C08J 2467/02* (2013.01); *C08L 2201/08* (2013.01); *C08L 2205/025* (2013.01); *C08L 2205/03* (2013.01)

(58) Field of Classification Search
CPC .... C08L 67/04; C08L 67/00; C08L 2205/025; C08L 2205/03; C08J 3/005; C08J 2367/04; C08G 63/52
USPC .............................................................. 524/15
See application file for complete search history.

(56) References Cited

U.S. PATENT DOCUMENTS

| | | |
|---|---|---|
| 9,139,689 B1* | 9/2015 | Flynn ..................... C08G 63/12 |
| 2007/0179253 A1* | 8/2007 | Matsuoka ............... C08L 67/04 525/438 |
| 2012/0095169 A1* | 4/2012 | Ogawa .................... C08L 67/04 525/450 |
| 2014/0378595 A1* | 12/2014 | Kim ........................ C08L 51/04 524/417 |
| 2016/0264776 A1* | 9/2016 | Wolfe ..................... C08L 67/04 |
| 2018/0215914 A1* | 8/2018 | Orts ........................ C08L 67/04 |

* cited by examiner

*Primary Examiner* — Hannah J Pak
(74) *Attorney, Agent, or Firm* — Ediz Yonter; John D. Fado

(57) ABSTRACT

Stereocomplex biopolymer compositions having tunable and improved mechanical properties and methods of making such compositions are disclosed. The biopolymer compositions include combinations of a matrix-forming polylactic acid comprising an essentially pure enantiomer and a tough polyester to form a polylactic acid matrix. The polylactic acid matrix is further combined with a base polylactic acid comprising an essentially pure opposite enantiomer of the first essentially pure enantiomer of the matrix-forming polylactic acid to form the stereocomplex.

22 Claims, 2 Drawing Sheets

HIGH HEAT DEFLECTION TEMPERATURE POLYLACTIC ACIDS WITH TUNABLE FLEXIBILITY AND TOUGHNESS

FIELD OF THE INVENTION

The disclosed invention relates generally to biopolymer compositions having improved and tunable mechanical properties and methods of making such compositions. More specifically, the invention relates to formulations useful for producing various bio-based plastic products with industrially desirable and tunable mechanical properties comprised of an enantiomeric pair of polylactic acids combined with at least one other polymeric component.

BACKGROUND OF THE INVENTION

Biopolymers are typically generated within biorefineries as a value added bio-based product in conjunction with biofuels, cattle feed, and other "green" chemicals extracted from agricultural feedstocks. Polylactic acid (PLA), in particular, is becoming a widely used biopolymer due to its desirable and useful commercial properties, biodegradability, and sustainability. PLA is, essentially, the only bio-based plastic (i.e., biopolymer) that has been commercialized widely to compete with petroleum-based plastics. Its market size has surpassed 200 million pounds per year, and its market penetration is projected to grow substantially, particularly if global markets adopt more stringent carbon cap-and-trade rules for greenhouse gas reduction and as consumers increasingly purchase compostable products.

PLA-based plastics are used because they are capable of forming stiff, clear films that compete reasonably well with, for example, polypropylene (PP), are biodegradable and derived from non-petroleum renewable feedstocks. PLA in its present form, however, faces restricted market penetration for several reasons, such as low softening temperature, brittleness, and higher cost relative to PP. At present, consumers are willing to pay a premium for environmental advantages of PLA, so improving its mechanical properties is paramount for continued market penetration. Improving its heat distortion temperature without increasing brittleness, for example, would allow the material to be used in a variety of products, such as coffee cup lids or even, in a foamed state, as coffee cups or microwaveable bowls and trays. In textile products it would allow materials to retain softness but permit them to be ironed and dried at higher temperatures.

The potential applications for PLA are expected to expand, for example, because (1) the agriculturally-derived monomer L-lactic acid is inexpensively produced in large scale by fermentation processes, (2) degradation velocity of polylactic acid is high in compost (i.e., it is quickly biodegradable), and (3) polylactic acid is excellent in its resistance to fungi and its ability to protect foods from odor or color contamination. PLA is typically derived, for example, from corn, tapioca, and/or sugarcane with commercial production and application in marketable products including drink bottles, cold liquid containers, packaging, magazine/book covers, diapers, single-use food items (e.g., plastic utensils), mulch-films, coatings (e.g., water/grease resistant coatings on single-use cups and plates, biocompatible coatings in medical implants), and textiles (e.g., apparel, furnishings, wipes).

Like most thermoplastics, PLA can be used to create different products using standard industrial processes such as sheet formation, blow molding, injection molding, and thermoforming. A challenge of using PLA in marketable single-use or durable goods products is its lack of stiffness (i.e., low modulus) unless additives such as talc, calcium carbonate, natural fibers, fiberglass, clays, or plasticizers (e.g., citrate esters) are added. Native PLA is relatively brittle compared to competitive petroleum-based plastics, such as polyethylene, polypropylene, and polyethylene terephthalate (commonly referred to as "PET" or "PETE"), and also exhibits a low heat distortion temperature. The heat distortion temperature of a polymer is the temperature at which the polymer becomes pliable (e.g., soft or fluid), and in its present unmodified, readily-available form, PLA "softens" at too low a temperature.

It is generally accepted by those of ordinary skill in the art that the mechanism for improving the ductility of PLA is to disrupt crystallization or to lower its glass transition temperature, both of which also disadvantageously reduce the heat resistance of resulting PLA products. Generally known techniques for making polylactic acid flexible are, for example, (1) copolymerization, (2) addition of a plasticizer, and (3) blending with other flexible polymers. Though these techniques generally improve the flexibility of the polylactic acid, there are problems associated with their use. Technique (1), immediately above, creates a material that generally has the properties needed for flexible films, but the production usually requires significantly higher capital costs which limits its use to large manufacturers of base resins. Technique (2) is used to "soften" a range of polyesters including polylactic acid or polyhydroxybutyrates (sometimes referred to as "PHB"), but the plasticizers tend to leach out thus making the plastics more brittle over time, which limits the product shelf-life. Another issue is that techniques (1) and (2) lower the glass transition temperature of the resin composition, thus changing the physical properties such as "weakening" the material (e.g., lowering of the tensile modulus). Technique (3) above usually involves blending two polymers with desired properties such as blending a flexible non-bioderived resin with a bio-derived biodegradable resin. Examples include blends with of D-polylactic acid and/or L-polylactic acid with polybutylene terephthalate-adipic acid, polybutylene succinate, polyethylene succinate, or polycaprolactone. In some cases, additional plasticizers (e.g., citrus esters) are still used in addition to the polymeric plasticizers (e.g., U.S. Pat. Nos. 5,817,721, 5,889,135; 6,018,004; 6,441,126; 6,592,913; 7,166,654; 9,085,689 which are incorporated herein by reference.)

The traditional means of additives to remedy this heat instability generally lead to brittleness and a loss of ductility. The glass transition temperature of PLA is typically about 60° C. for the high molecular weight, semi-crystalline commercial products generally found on the market, which is relatively high compared to, for example, polyethylene and polypropylene and similar semi-crystalline commodity plastics. Thermal stability depends on maintaining a high crystallization temperature and/or high degree of crystallinity to overcome the onset of softening. The mechanism of increasing the heat distortion temperature, for example, is to improve both the degree and rate of crystallization. However, increasing crystallization is commonly believed to also increase the brittleness of the polymer. Nucleating agents, for example, generally increase the rate and degree of crystallization, thus creating polymers that also tend to be more brittle.

Beyond single use and niche markets, PLA also has broader potential market appeal in durable goods such as automotive parts, building materials, and household wares. It is difficult for unmodified PLA to be used for long-term, high performance applications such as injection molded automotive parts or hot liquid (e.g., microwaveable) containers due to its inherent brittleness and poor thermal resistance. Efforts have been made in the industry to improve these bulk properties but, generally, improvement in one property, such as improved thermal resistance, occurs at the expense of another, such as a loss in ductility (i.e., increased brittleness) of the product. For PLA to be useful in durable goods, several obstacles must be surmounted including, for example, increasing its heat distortion temperature and improving impact resistance, to make PLA-based products with mechanical properties that are more competitive with respect to petroleum-based plastics.

There thus exists an industrial need to improve the bulk material properties of PLA-based products to broaden potential market applications as an environmentally-friendly, sustainable polymer. In particular, there is a need for adding functionality to PLA-based products by improving heat distortion temperature and flexibility. These improvements will allow PLA-based products to be more broadly used in applications where materials are subjected to elevated temperatures such as single-use foamed products, hot-fill bottles, microwaveable packages, durable goods, apparel that can withstand ironing and intensive drying temperatures, and automotive applications.

SUMMARY OF THE INVENTION

The present invention accordingly provides a biopolymer composition having a desirable and tunable balance between toughness and heat tolerance with improved polymer chain mobility and enhanced nucleating ability of the particulates, thus yielding a plastic with commercially viable properties. In an aspect, the invention is a bio-based polymer composition characterized as a stereocomplex and synthesized from a blend of renewable polymers. The invention provides biopolymer compositions including a base polylactic acid comprising an essentially pure enantiomer, a matrix-forming polylactic acid comprising an essentially pure opposite enantiomer of the base polylactic acid, and a tough polyester.

In a further aspect, the invention provides methods of forming biopolymer compositions. The methods include combining a matrix-forming polylactic acid comprising an essentially pure enantiomer and a tough polyester to form a polylactic acid matrix. The polylactic acid matrix is then combined with a base polylactic acid comprising an essentially pure opposite enantiomer of the first essentially pure enantiomer of the matrix-forming polylactic acid to create a stereocomplex biopolymer composition. An article of manufacture is thereafter formed with the stereocomplex.

It is an advantage of the invention to provide novel PLA-based compositions having a synergistic crystallization rate resulting in a bio-based plastic with commercially favorable mechanical properties.

It is an additional advantage of this invention to fill an industrial void by providing cost-effective PLA modifiers that allow for wide-use application of PLA-based materials in an array of commercial products.

It is a further advantage of the present invention to provide new polymeric technologies for improved PLA-based products in commercial applications including packaging, durable goods, hot liquid containers, and single-use products, among others.

It is another advantage of the present invention to provide novel compositions that create an array of PLA-based applications to add flexibility to commercial biorefinery operations via value-added co-products from agriculturally-derived feedstocks.

It is yet another advantage of the present invention to provide a method of more efficiently and cost-effectively forming PLA-based products into foamed packaging materials by either melt extrusion foaming (e.g., similar to extruded polystyrene foamed packages) or by solvent-assisted foaming (e.g., similar to cup-molding technology) as a result of higher heat distortion temperatures.

Another advantage of the invention is to provide biopolymer compositions and methods of making biopolymer compositions with tunable, tailored mechanical properties including heat transition temperature, toughness, and tensile modulus.

Additional advantages of the invention include providing engineering property requirements in biopolymer compositions currently found in conventional non-sustainable based resins, such as Nylon 6, polybutylene terephthalate, polyethylene terephthalate, polybutylene succinate, polypropylene, polyethylene, and others.

A further advantage of the invention is to provide a novel combination of additives that combines a stereocomplex-forming matrix with a plasticizer for improved toughness.

This summary is provided to introduce a selection of concepts in a simplified form that are further described below in the detailed description. This summary is not intended to identify all key or essential features of the claimed subject matter, nor is it intended as an aid in determining the scope of the claimed subject matter.

DETAILED DESCRIPTION OF THE INVENTION

Unless herein defined otherwise, all technical and scientific terms used herein generally have the same meaning as commonly understood by one of ordinary skill in the art to which this invention belongs. The definitions below may or may not be used in capitalized form herein and are intended to be used as a guide for one of ordinary skill in the art to make and use the invention and are not intended to limit the scope of the invention. Mention of tradenames or commercial products is solely for the purpose of providing specific information or examples and does not imply recommendation or endorsement of such products.

"Biopolymer" means any polymer with repeating units derived at least partially or fully from a biologically renewable source (e.g., bio-based) including via agricultural production.

"Compatibilizing unit" means a lower alkyl organic acid selected to form a more miscible blend with a desired base biopolymer or polymer. For example, if the base biopolymer is polylactic acid, then the compatibilizing unit could be lactic acid.

"Fiber" means a plant-derived complex carbohydrate generally forming threads or filaments, often categorized as either water soluble or water insoluble, which as a class of natural or synthetic materials, have an axis of symmetry determined by their length-to-diameter (L/D) ratio. They may vary in their shape such as filamentous, cylindrical, oval, round, elongated, globular, the like, and combinations thereof. Their size may range from nanometers up to millimeters. As an additive in a latex film, for example, fibers generally serve as a filler material that provides dimensional stability and changes in texture to the final product. Natural fibers are generally derived from substances such as cellulose, hemicellulose, lignin, pectin, and proteins.

"Glass Transition Temperature" or "$T_g$" means the temperature point at which the polymer material transitions from a relatively hard, brittle (i.e., "glassy") state into a more fluid or rubber-like state as the temperature is increased.

"Heat Deflection Temperature" or "Heat Distortion Temperature" means a temperature that is determined by heating the polymer material and noting the point in which significant softening has occurred, allowing the sample to be readily pliable. Improved heat resistance and improved thermal stability correspond to higher heat deflection temperatures.

"HDT" or "Lapol HDT" mean products of PDLA (a version of which is produced by and available from Lapol, LLC, Santa Barbara, Calif.) including a composition comprising a copolymer of PLA having a PDLA compatibilizing unit synthetically attached to a plasticizer unit.

"HDTP" or "Lapol HDTP" means a product of PDLA combined with a plasticizer/nucleating agent of a low melting temperature polyester (e.g., Tough Polyester), a version of which is available from Lapol, LLC (Santa Barbara, Calif.).

Figure 1:
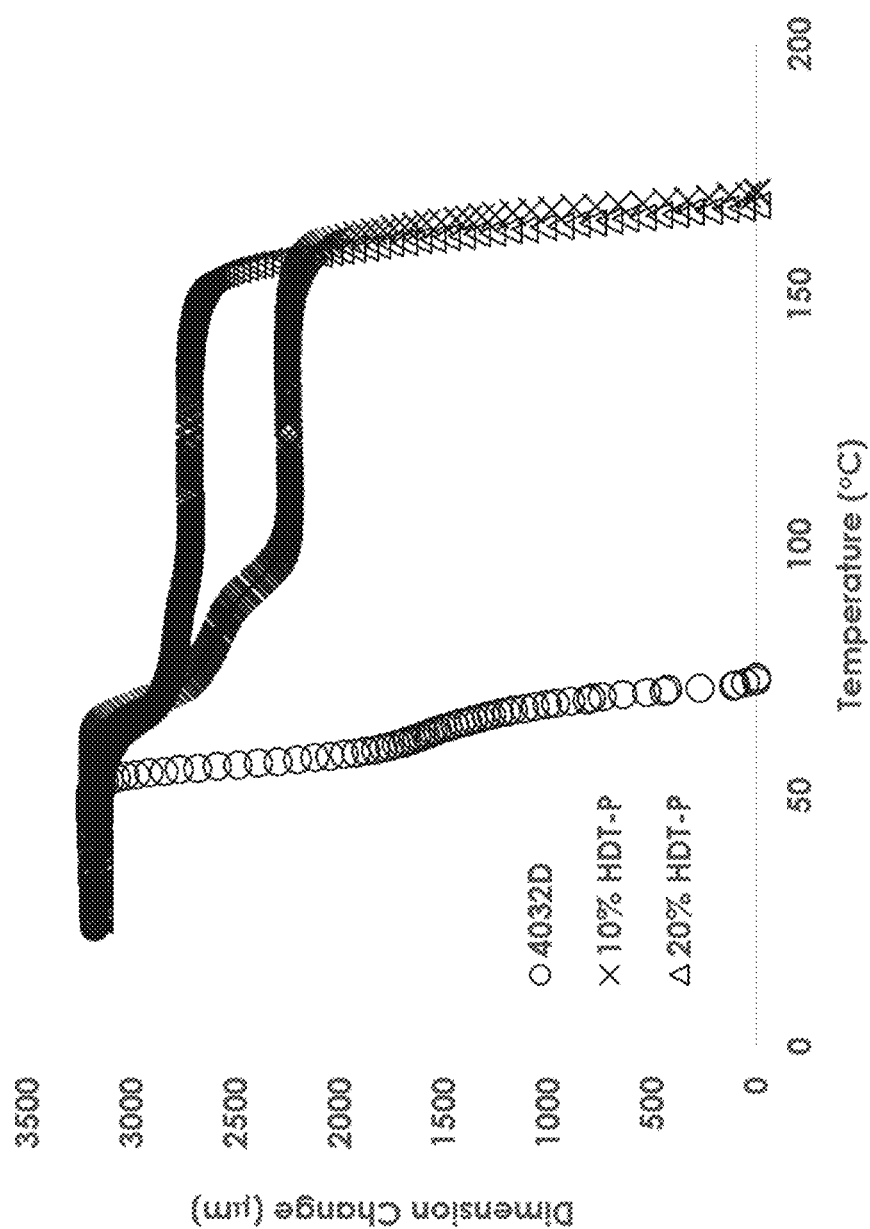
FIG. 1 shows thermomechanical analyzer data of neat or unmodified PLLA, 10%, and 20% Lapol HDTP blends in PLLA.
Figure 2:
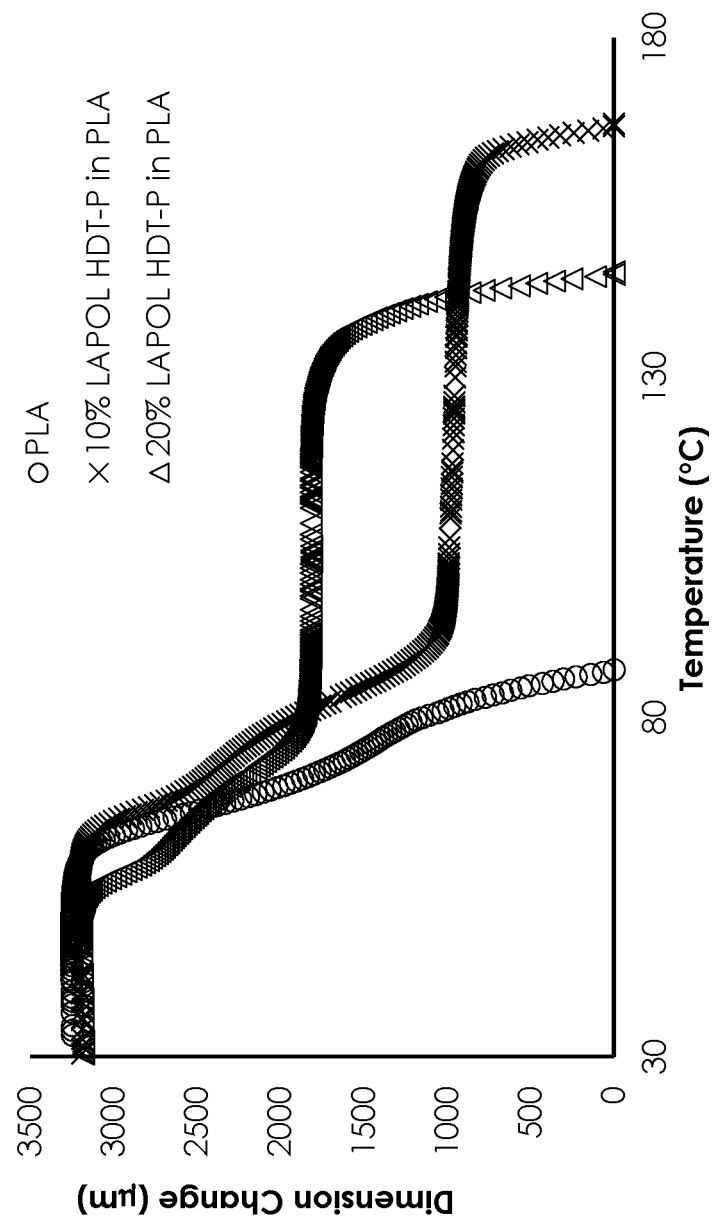
FIG. 2 shows thermomechanical analyzer data of neat or unmodified PLLA, 10%, and 20% Lapol HDTP blends including depictions of injection molded disposable utensils at various temperatures on the curves.

"Improved Heat Resistance" means a thermal resistance that is significantly improved as illustrated, for example, by a thermomechanical analyzer graph representation (e.g., FIG. 1 and FIG. 2).

"Improved Toughness" means an increase in ability of a polymer to absorb stress without breaking through the transfer of impact energy to plastic flow (e.g., the ability of the polymer molecules to move within the solid polymer material) or dispersing the energy through a larger portion the solid polymer material.

"Nucleating Agent" means an insoluble particulate including but not limited to talc, calcium carbonate, organoclays, phosphate salts, the like, and combinations thereof capable of increasing the rate of polymer crystallization. Other types of nucleating agents which are specific to PLLA is PDLA (i.e., PLA enantiomers), or vice versa. That is, PLLA and PDLA are stereoisomers or enantiomers derived from chiral monomers that are opposite enantiomers (e.g., mirror images) of one another.

"PDLA" means PLA comprised essentially solely of D-lactyl monomeric units (i.e., primarily comprised of lactic acid D-enantiomer, which is the opposite enantiomer (e.g., mirror image) of the L-enantiomer).

"Plasticizer" means a low molecular weight additive, including short-chain polymers that disrupt polymer-polymer chain bonding or crystallization, which provides increased mobility for the polymers, resulting in a more easily deformable mass. Plasticizers can, for example, decrease the modulus, tensile strength, and glass transition temperature of a polymer, while simultaneously increasing the polymer flexibility and elongation at break.

"PLLA" means PLA comprised essentially solely of L-lactyl monomeric units (i.e., primarily comprised of lactic acid L-enantiomer, which is the opposite enantiomer (e.g., mirror image) of the D-enantiomer).

"Polylactic Acid" or "PLA" means a biodegradable thermoplastic aliphatic polyester often derived commercially from bio-based precursors such as corn starch, tapioca starch, sugarcane, the like, and combinations thereof.

"Stereocomplex" means a double helix crystal formed between two polymer strands where each strand comprises an opposite enantiomer (e.g., "D" enantiomer and "L" enantiomer). Melting temperatures are typically higher than complexes formed from either of the enantiomers alone.

"Stereocomplex-Forming" means the ability of a polymer to form a stereocomplex during, for example, a melt-blending process or non-isothermal crystallization.

"Tough" or "Toughness" means the area under a stress/strain curve in which an increasingly tough polymer results in respectively more area under such a curve as measured, for example, by standard instruments for measuring the stress and strain of polymers. Increased toughness corresponds generally to an improvement in ductility of a polymer without a decrease in its tensile strength.

"Tough Polyester" and "Tough Rubbers" mean materials that induce energy dissipation mechanisms in PLA, retard crack initiation and propagation, and result in a material with improved ductility without loss of strength. For example, these types of polymers or rubbers can include but are not limited to low $T_g$ polyesters such as PBAT or PBS, functionalized polyolefins, polyvinyl acetates, polyurethanes, and rubber (synthetic or natural).

Disclosed herein are biopolymer compositions that will improve the heat deflection temperature of PLA-based materials without inducing significant brittleness, thus improving ductility of the materials, as further disclosed herein. Techniques currently known in the art for reducing the inherent brittleness of PLA-based materials are (1) copolymerization of lactic acid monomers with flexible monomeric units, (2) blending with low molecular weight additives, or (3) blending with other flexible polymers, including short-chain PLA. For technique (1), monomers such as caprolactone and poly(ethylene glycol) have been copolymerized with lactic acid or lactide to produce flexible films. One drawback to this method is the added cost in synthesizing these tailored PLA-based resins. Technique (2) can involve blending PLA with low molecular weight commercial plasticizers such as citrate esters, glycerol, or poly(ethylene glycol). However, one of the drawbacks of applying plasticizers is that they often migrate to the surface of the resin over time. This aging process reverses the benefits of plasticization and, ultimately, makes the blends even more crystalline and brittle. Technique (3) often involves melt-blending PLA with low $T_g$, low crystalline "tough" polymers and rubbers. Examples include blends of PLA with natural and synthetic rubbers such as polyisoprene, polybutadiene, polystyrene-butadiene-styrene copolymer, or rubber extracted from natural rubber trees, guayule, dandelion, or other latex producing plants, as well as blends of PLA with (butylene-adipate-co-terephthalate) (PBAT) or poly(butylene succinate) (PBS). For example, a biodegradable PBAT formulation commercially known as Ecoflex (BASF, Florham Park, N.J.) can improve the flexibility and tear resistance of various polymers, including PLA, as well as Bionelle (Showa Denko, New York, N.Y.) which is a high molecular weight PBS. A limitation of technique (3), however, is the observed consequent decrease in strength and modulus of the plasticized PLA blends and the lack of improved heat tolerance of the PLA-based products.

Current techniques for making PLA more temperature tolerant are (A) induced crystallization, (B) reinforcement with fibers, or (C) blending with neat or modified minerals including an array of sheeted clays. Technique (A) involves a post-production annealing step which is generally not cost-effective. Technique (B) involves blending PLA with naturally-occurring fibers to be used as fillers. Although this is a cost-effective method and can reduce environmental biomass waste, it makes the blend more susceptible to water uptake and fungal contamination, thus limiting its potential applications. Technique (C) involves the addition of nucleating agents. Talc, calcium carbonate, and organoclays have been applied as nucleating agents to increase the relatively slow crystallization rate of PLA. All of these compositions, however, add cost to manufacturing, add weight to finished products, and, more importantly, rely on non-equilibrium modifications to final products. As a result, slight changes in processing and/or changes in thermal history (e.g., storage in the sun or non-climate-controlled environments) can readily reverse desired effects via migration of these additives into aggregates or to the particle surface, thus alleviating benefits. Technique (C) can also involve the addition of low molecular weight PDLA. Stereocomplexation of PDLA and PLLA can be an effective method of increasing the crystallization rate of PLA-based materials. It is known that the formation of the stereocomplex during processing or non-isothermal crystallization acts as a significant nucleating agent, even at very low concentrations, with crystallization rates for racemic mixtures of PLLA and PDLA rivaling rates from blends with talc. However, one drawback of increasing the crystallinity, and ultimately heat deflection temperature, is that it can lead to brittleness that can further reduce industrial applications of PLA. As mentioned, improved toughness is a desired property for certain applications such as, for example, food containers or disposable utensils. There is very little commercial demand for brittle materials despite having high heat tolerance.

Most previous research efforts have focused on studying the individual modifications separately, for example, by either improving ductility or increasing the heat tolerance of PLA-based materials. It is generally accepted in the field that each of these attributes is in conflict with the other. Thus, there was no obvious reason to believe that a plasticizer would act as a nucleating agent (i.e., raising the softening temperature) and still retain its plasticizing properties (i.e., improving ductility). As a result, there has been very limited research examining the combined effects of polymer toughening and nucleation measurement on the mechanical and thermomechanical properties of PLA-based materials, especially as a single, targeted approach.

It is generally understood in the art that there are two enantiomers of lactic acid and thus two enantiomeric polymeric forms, the L-enantiomer PLLA and the D-enantiomer, PDLA. The L-enantiomer is more common and less costly as the naturally-occurring microbes produce lactic acid in the L-enantiomeric form. The physical parameters of these two enantiomeric polymers are similar with distinct differences, which leads to interesting properties and possibilities. For example, PLLA generally has a melting temperature from about 155° C. to about 190° C., a glass transition temperature from about 65° C. to about 80° C., and an average crystallinity of about 30%. PDLA typically has a melting temperature in the range from about 170° C. to about 200° C., a glass transition temperature between about 65° C. to about 90° C., and an average crystallization of up to approximately 60%. When the two enantiomeric polymers are mixed in even proportions, they form a double helix crystal called a stereocomplex with a melting temperature that is from about 70° C. to about 100° C. higher than either pure enantiomeric polymer alone.

In this invention, a biopolymer composition is described that surprisingly exhibits both improved toughness and a higher heat distortion temperature as compared to conventional biopolymers. For example, to alter biopolymer mechanical properties, plasticizers are added to reduce brittleness while nucleating agents are added to increase modulus and heat resistance. Plasticizers and nucleating agents are generally antagonistic (e.g., increasing nucleation increases brittleness and addition of plasticizers decreases heat resistance). It is commonly believed that one of these agents would nullify the effects of the other and thus they are generally not used in tandem. The novel formulations of the present invention are comprised of an enantiomeric pair of polylactic acids (i.e., a polylactic acid comprised of essentially pure D-lactyl monomeric units and another polylactic acid comprised of essentially pure L-lactyl monomeric units) as well as a tough polyester. These components are combined as herein described to create a stereocomplex with surprisingly tunable and favorable mechanical properties. For example, in the biopolymer composition of the invention the weight-to-weight ratio of the components may be adjusted by increasing the relative amount of tough polyester to cause an increase in the toughness of a product (e.g., an article of manufacture) formed from the stereocomplex biopolymer. In another example, in the biopolymer composition of the invention the weight-to-weight ratio of the components may be adjusted by decreasing the relative amount of tough polyester to cause an increase in the heat resistance of a product (e.g., an article of manufacture) formed from the stereocomplex biopolymer.

The disclosed stereocomplex biopolymer composition is comprised of a blend of polymers and, at the molecular level, is thought to have a new type of stable crystal structure in the form of a crystalline double-helix, although other microstructures may also be present. Control of the stereocomplex crystalline morphology of the PLA-based polymer products of the invention can be obtained in order to ultimately tailor desired commercial properties. PLLA, for example, when blended with the disclosed methods can have improved heat deflection temperature surprisingly without sacrificing ductility due to the concomitant increase in crystallinity. Moreover, unexpectedly no additional steps are needed such as post-production annealing to achieve desired toughness and crystallinity.

The biopolymer of the invention includes combinations of a base PLA comprising an essentially pure enantiomer, a tough polyester, and a matrix-forming PLA comprising an essentially pure opposite enantiomer of the base PLA essentially pure enantiomer. The term "essentially pure" means a preferred enantiomeric purity, for example, comprising no more than about 5 weight % (e.g., 5 weight %) of the opposite enantiomer, most preferably, below about 1 weight % (e.g., 1 weight %) of the opposite enantiomer. In other embodiments, the enantiomeric purity may range from less than about 1% up to about 5% (e.g., 0.5% to 1%, 1% to 2%, 2% to 3%, 3% to 40%, 4% to 5%, 5% to 6%). The disclosed combinations surprisingly result in a significantly higher melting temperature and toughness than a biopolymer formed from either of the enantiomers alone and exhibit tunability of these characteristics depending on the component ratios. The stereocomplex in this case refers to the two enantiomers of PLA, sometimes referred to herein generally as PLLA and PDLA. The monomers that make up these two versions of PLA are chemically identical but are opposite enantiomers (e.g., mirror images) of each other, with their side-chain methyl group being in opposite directions. Thus, the polymers, PLLA and PDLA, are an enantiomeric pair whereby aggregates of PLLA and PDLA produced via the methods of the disclosed invention are referred to as "stereocomplexes."

In embodiments, the biopolymer composition of the invention comprises a base polylactic acid, a tough polyester, and a matrix-forming polylactic acid. The preferred number average molecular weight of the base polylactic acid is from about 50,000 Da to about 2,000,000 Da. In other embodiments, the base polylactic acid has a number average molecular weight from about 50,000 Da to about 300,000 Da, or from about 50,000 Da to about 150,000 Da. In preferred embodiments, the base polylactic acid has a number average molecular weight from about 120,000 Da to about 150,000 Da (e.g., 120,000 Da to 150,000 Da). The essentially pure enantiomer of the base polylactic acid may be comprised essentially solely of L-lactyl monomeric units or of D-lactyl monomeric units. PLA having L-lactyl monomeric units is preferred as the base polylactic acid. Such PLLA materials are commercially available from a variety of sources, for example, Ingeo Biopolymer 3001D or 4032D (Cargill, Inc. via its subsidiary NatureWorks, LLC, Minnetonka, Minn.), and PLA resin (Corbion, Lenexa, Kans.). In addition, methods of synthesizing PLLA for use in the methods of the invention are known in the art. It can be synthesized, for example, using a ring-opening polymerization of L-lactide and special equipment such a reactive twin-screw extruder.

The tough polyester used in the methods of the invention induces energy dissipation mechanisms in PLA that retard crack initiation and crack propagation, ultimately resulting in a material with improved toughness. These types of polyesters can include but are not limited to low $T_g$ polyesters such as PBAT or PBS, although these polyesters need not be miscible with the PLA matrix. Miscibility generally means that a polymer mixture exists in a single physical phase. Polymer blends with a single phase have physical properties such as a single melt temperature and glass transition temperature, typically somewhere between the values of the individual polymers in the mixture. If polymer blends are not miscible, then there will be two phases which equates to two glass transition temperatures and two melt temperatures correlating to the different polymers in the blends. Mechanical properties, such as impact resistance and modulus, can be diminished due to the antagonistic separation of each component in polymer blends that are not miscible. A surprising aspect of the present invention is that polymer blends may be immiscible and yet the physical and mechanical properties are improved and not diminished.

The tough polyester may be selected from polyesters including, for example, polybutylene-adipate-co-terephthalate, polybutylene succinate, functionalized polyolefins, polyvinyl acetates, polyurethanes, natural rubber, synthetic rubber, the like, and combinations thereof. Examples of commercially available tough polyesters include Ecoflex (BASF, Florham Park, N.J.) and Bionelle (Showa Denko, New York, N.Y.) or polyvinyl acetates such as the Vinnex (Wacker Chemie AG, Munich, Germany). In embodiments, polybutylene succinate (PBS) is used as the tough polyester. It is a biodegradable polyester with properties similar to commercially available petroleum-based polymers such as polyethylene and polypropylene. Industrially, it can be synthesized via the polycondensation of two monomeric units, succinic acid and 1,4-butanediol. The 1,4-butanediol is esterified with the succinic acid to form low molecular weight PBS oligomers. These oligomers are then formed into high molecular weight polymers through transesterification under vacuum catalyzed conditions typically in the presence of titanium catalysts.

Monomeric units comprising the tough polyester may include, for example, diol monomeric units, diacid monomeric units, and combinations thereof. The tough polyesters may be prepared by any method known in the art including, for example, via polycondensation of diol and diacid monomeric units and optionally catalyzed by a catalyst or combination of catalysts (e.g., acid catalysts, organometallic catalysts, earth metal catalysts such as stannous chloride, stannous octanoate, titanium chloride, lanthanum chloride, the like, and combinations thereof). Exemplary diols include difunctional alcohols or diols, such as dianhydro-D-glucitol, 1,2 propanediol, 1,3 propanediol, ethylene glycol, diethylene glycol, triethylene glycol, polyethylene glycol, tetraethylene glycol, polytetrahydrofuran, neopentyl glycol, propylene glycol, dipropylene glycol, dibromoneopentyl glycol, propoxylated bispheno-A, ethoxylated bisphenol A, 2,2,4-trimethylpentane-1,3-diol, tetrabromobisphenol dipropoxy ether, 1,4-butanediol, 1,3 butanediol, 1,5 pentanediol, 1,6 hexanediol, 1,7 heptanediol, octanediol, cyclopentadiol, cyclohexanediol, cyclohexanedimethanol, or their derivatives, and mixtures thereof. Difunctional alcohols having a carbon number of 2-10 are presently preferable; however, a person of ordinary skill in the art may select any suitable monomer such as diol(s) and/or diacid(s). In embodiments, multifunctional alcohols may also be used and can be selected from, for example, the group consisting of, but not limited to, glycerin, trimethyl propanol, trimethoxypropane, trimethoxyethane, pentaerythritol, cyclohexanemethanediol, polyester oligomers of pentaerythritol such as Capa 4101 (Perstop Holding AB, Malmo, Sweden), and mixtures thereof.

In embodiments, the tough polyester has a number average molecular weight range from about 2,000 Da to about 500,000 Da (e.g., 2,000 Da to 500,000 Da), or from about 5,000 Da to about 300,000 Da (e.g., 5,000 Da to 300,000 Da), or from about 50,000 Da to about 150,000 Da (e.g., 50,000 Da to 150,000 Da), or from about 20,000 Da to about 100,000 Da (e.g., 20,000 Da to 100,000 Da). The glass transition temperature of the tough polyester ranges from about −75° C. to about 40° C. (e.g., −75° C. to 40° C.), or preferably from about −20° C. to about 20° C. (e.g., −20° C. to 20° C.) and a melting temperature between about 60° C. and about 120° C. (e.g., 60° C. to 120° C.). The low glass transition temperature of the tough polyester ensures that the tough polyester will act as a plasticizer as its $T_g$ is below to slightly above room temperature. The melting temperature range overlaps with the crystallization temperature of native or unmodified PLA. In this way, upon cooling, the tough polyester will begin to solidify and act as a nucleating agent and increase total crystallization and crystallization speed. The matrix-forming polylactic acid and the tough polyester are melt-blended in a weight-to-weight ratio from about 1:99 to about 99:1 (e.g., 1:99 to 99:1), or preferably from about 30:70 to about 70:30 (e.g., 30:70 to 70:30), or more preferably from about 45:55 to about 55:45 (e.g., 45:55 to 55:45) to form a polylactic acid matrix.

In embodiments, the matrix-forming polylactic acid comprises an essentially pure opposite enantiomer of the first essentially pure enantiomer of the base polylactic acid. The essentially pure enantiomer of the matrix-forming polylactic acid may be comprised essentially solely of D-lactyl monomeric units or of L-lactyl monomeric units. PLA having D-lactyl monomeric units is preferred as the matrix-forming polylactic acid. The melting temperature of the matrix-forming polylactic acid is, for example, in a range from about 150° C. to about 250° C. (e.g., 150° C. to 250° C.), or from about 150° C. to about 200° C. (e.g., 150° C. to 200° C.), or from about 165° C. to about 195° C. (e.g., 165° C. to 195° C.). This matrix-forming polylactic acid component is preferably selected by the skilled artisan to have a melting temperature that is sufficiently close to or below the processing temperature to ensure the melt-blending process proceeds efficiently to create a stereocomplex product with the polylactic acid matrix. An improper melting temperature selection may cause the product to not sufficiently form the stereocomplex and lead to result that is not desirable.

The preferred number average molecular weight of the matrix-forming polylactic acid is from about 500 Da to about 500,000 Da (e.g., 500 Da to 500,000 Da). In other embodiments, the second polylactic acid has a number average molecular weight from about 1,000 Da to about 100,000 Da (e.g., 1,000 Da to 100,000 Da), or from about 5,000 Da to about 50,000 Da (e.g., 5,000 Da to 50,000 Da), or from about 500 to about 30,000 Da (e.g., 500 Da to 30,000 Da), or from about 10,000 Da to about 50,000 Da (e.g., 10,000 Da to 50,000 Da), or from about 5,000 Da to about 20,000 Da (e.g., 5,000 Da to 20,000 Da). Molecular weight selection for the matrix-forming polylactic acid component contributes significantly to the tunability of the mechanical properties of the product. For example, selection of the matrix-forming polylactic acid towards the lower molecular weight of the disclosed ranges results in a product with increased brittleness, but an improvement in heat deflection temperature as compared to native unmodified PLA (e.g., PLLA) for the final product. Selection of the matrix-forming polylactic acid towards the higher molecular weight ranges results in a product with lower brittleness with a lower improvement in heat deflection temperature as compared to native unmodified PLA (e.g., PLLA). In preferred embodiments, the molecular weight selection of the matrix-forming polylactic acid is lower than the base polylactic acid.

In an embodiment, the matrix-forming polylactic acid is a commercially available product referred to as "Lapol HDT," which is produced by Lapol, LLC (Santa Barbara, Calif.). Lapol HDT is comprised of a copolymer of PLA having a PDLA unit with a molecular weight range of 5,000-150,000 synthetically attached to a plasticizer unit with a molecular weight range of 1,000-2,000 Daltons. Though any suitable synthetic process may be used by a skilled artisan, it is typically synthesized via a two-step process: (1) ring-opening polymerization of D-lactide to form PDLA and then (2) the addition of the "Lapol HDT Prepolymer," which is a polyester comprised of glycerine, di(ethylene glycol), and maleic anhydride.

In embodiments, the weight-to-weight ratio of the tough polyester to the matrix forming polylactic acid is from about 1:99 to about 99:1 (e.g., 1:99 to 99:1), or from about 10:90 to about 90:10 (e.g., 10:90 to 90:10), or from about 30:70 to about 70:30 (e.g., 30:70 to 70:30), or from about 45:55 to about 55:45 (e.g., 45:55 to 55:45), or about 50:50 (e.g., 50:50). Selection for the ratio of the tough polyester to the matrix-forming polylactic acid component contributes significantly to the tunability of the mechanical properties of the product. For example, increasing the amount of tough polyester relative to the amount of the matrix-forming polylactic acid yields a product with increased toughness with lower improvement in heat deflection temperature as compared to native or unmodified PLA for the final product. Selection of a lower ratio of tough polyester to the matrix-forming polylactic acid yields a lower improvement in toughness with a higher improvement in heat deflection temperature as compared to native or unmodified PLA.

In embodiments, the polylactic acid matrix (i.e., the combined product of the matrix-forming polylactic acid and the tough polyester) and the base polylactic acid form a stereocomplex when combined (e.g, melt-blended) at a weight-to-weight ratio from about 5:95 to about 95:5 (e.g., from 5:95 to 95:5), or from about 10:90 to about 90:10 (e.g., 10:90 to 90:10), or from about 20:80 to about 80:20 (e.g., 20:80 to 80:20), or from about 30:70 to about 70:30 (e.g., 30:70 to 70:30), or from about 10:90 to about 30:70 (e.g., 10:90 to 30:70). In preferred embodiments, the ratio of the polylactic acid matrix to the base polylactic acid is from about 10:90 to about 20:80 (e.g., 10:90 to 20:80), or about 10:90 (e.g., 10:90), or about 20:80 (e.g., 20:80).

Generally, combining PDLA and PLLA forms a stereocomplex typically to the degree of the amounts of the respective enantiomers are present. That is, the resulting blend would be a mixture of a stereocomplex and excess PLLA or PDLA. Such a mixture would show up, for example, in a differential scanning calorimetry curve as two melting temperature enthalpies generally proportional to the amount of stereocomplex formed. For example, if 10% PDLA were added to 90% PLLA, the 10% PDLA would stereocomplex with 10% of the PLLA, leaving the remaining 80% PLLA outside of the stereocomplex. When added during formation of product as in a thermoforming or film forming operation, the stereocomplex acts both as a nucleating agent and as a stiffening agent to the polymer part improving its tensile modulus as well as its heat distortion temperature. Those skilled in the art will understand that reversing the continuous and discontinuous phases, to vary the concentrations of PDLA and PLLA is within the scope of this invention.

The bulk material properties of the disclosed biopolymer compositions were surprisingly improved, including increased in toughness, modulus, and heat distortion temperature. Improvements in both toughness and increase heat stability will significantly broaden the field of commercial use via improved functionality for the disclosed biopolymers. Products with improved heat distortion temperature and higher flexibility will expand potential markets for such agriculturally-derived and sustainable plastics in applications such as single-use foamed products, hot-fill bottles, microwaveable packages, durable goods, single-use utensils, bowls, textiles, and multiple other areas. A toughened biopolymer composition is described with improved heat distortion temperature for use in high temperature applications. The disclosed blend has surprisingly improved heat deflection temperature when compared to conventional PLA-based materials which is comprised of, for example, the L-enantiomer of lactyl monomeric units. For example, the addition of D-lactyl monomeric units in PLLA as in the presently disclosed methods decreases the melting temperature as well as the heat deflection temperature of the mixed L/D PLA-based product. The weight ratio range of the plasticizer/stereocomplexing agent to PLLA are adjustable either to increase the toughness or the heat resistance of the resulting blend such that the properties can be tailored to specific applications.

There is typically an antagonistic relationship between the addition of plasticizer and stereocomplex agent into PLA-based materials. Those versed in the art generally would maintain that the addition of more plasticizer would increase the flexibility of the PLA-based material, with a corresponding decrease in heat distortion temperature. Conversely, the more stereocomplex agent added to the PLA-based polymer, the greater the heat distortion temperature, generally resulting in a correspondingly more brittle material. This relationship can be exploited to tune properties for different applications. Larger amounts of plasticizer may be added, for example, for applications that need increased flexibility with moderate amounts of heat stability such as cutlery and burger clamshells. Conversely, larger amounts of stereocomplex may be added for higher temperature applications such as coffee cups, microwaveable bowls, and automotive parts.

The chain length of the two different enantiomeric PLA forms is important if the stereocomplex unit in the polymer mixture is to have the desired mechanical properties. When the chain length of the discontinuous polymer is too long, the chain entanglement and kinetics are generally too slow for the stereocomplex to form in heat blending conditions as are found in polymer processing. As a result, the higher the molecular weight and/or the closer the two polymers are in molecular weight, the less effective the crystallization and the advantage of the stereocomplex decreases or is lost. When the discontinuous phase enantiomer is shorter than the base polylactic acid (continuous phase), the shorter chained discontinuous phase enantiomer has more mobility and thus forms the stereocomplex more quickly. The length of the continuous phase polymer is preferably at least about 100 lactic acid units or greater and the discontinuous phase polymer is preferably less than about 50 lactic acid units long.

The range of the polymer chain length ratios of the two enantiomeric polymers relative to each other (i.e., continuous phase:discontinuous phase) is from about 1:1 to about 50:1 (e.g., 1:1 to 50:1). The preferred ratio of the polymer lengths of the two enantiomeric polymer chains is about 2:1 to about 25:1 (e.g., 2:1 to 25:1). The most preferred ratio is from about 5:1 to about 12.5:1 (e.g., 5:1 to 12.5:1). The semantics for talking about polymer length for those skilled in the art is typically in terms of molecular weight of the monomers. The total weight of the polymer may be determined by the weight of each monomeric units multiplied by the number of monomeric units in the polymer. Thus, for example, the molecular of weight of lactic acid is about 100 Da, the chain length of the continuous phase to discontinuous phase PLA units in terms of molecular weight may be determined as follows. Polymers of 125,000:125,000 Da may be used for a 1:1 ratio and 125,000:2500 Da may be used for a 50:1 ratio. The preferred ratio of the polymer lengths in terms of molecular weight are about 125,000:75,000 Da for the 2:1 ratio and about 125,000:5000 Da for the 25:1 ratio. The most preferred ratio of the polymer lengths of the continuous phase polymer to the discontinuous phase polymer are about 125,000:25,000 Da for the 5:1 ratio and about 125,000:10,000 Da for the 12.5:1 ratio. It should be appreciated that any of the disclosed molecular weight ranges may be used in these ratios.

In embodiments, the weight-to-weight ratio of the polylactic acid matrix and the base polylactic acid that forms the stereocomplex when combined (e.g., melt-blended) with the polylactic acid matrix may be adjusted by increasing the amount of the tough polyester in the polylactic acid matrix to cause an increase in toughness in a product formed from the stereocomplex. The toughness of the biopolymer product of the invention is from about 1.40 MPa to about 5.00 MPa (e.g., 1.40 MPa to 5.00 MPa), or from about 2.00 MPa to about 5.00 MPa (e.g., 2.00 MPa to 5.00 MPa), or at least about 2.00 MPa (e.g., at least 2.00 MPa).

In embodiments, the weight-to-weight ratio of the polylactic acid matrix and the base polylactic acid that forms the stereocomplex when combined (e.g., melt-blended) with the polylactic acid matrix may be adjusted by decreasing the amount of the tough polyester in the polylactic acid matrix to cause a surprising increase in heat resistance in a product formed from the stereocomplex. This increased heat resistance allows such biopolymers to be used more widely in applications such as, for example, cutlery, textile applications (e.g., where material is subjected to heat via pressing and ironing) spun fibers for incontinence applications and surgical dressings and apparel, containers for packaging and hot server items (e.g., cups for hot/boiling liquids like tea or coffee), making of prototypes via 3-D printing techniques. The heat distortion temperature of the biopolymer product of the invention has an average heat distortion temperature about 10° C. to about 50° C. (e.g., 10° C. to 50° C.) greater than a conventional polylactic acid alone.

In embodiments, additional components may be added to the biopolymer compositions of the invention for use in particular applications. Such components may be selected, for example, based on a desired price, color, clarity, texture, and the like for the final product. Additional components may include, for example, minerals, organic fillers, fibers (e.g., organic fibers, inorganic fibers, or manufactured fibers), agricultural waste streams, and combinations thereof. Minerals may include, for example, clays including surface modified clays, talc, calcium carbonate, gypsum, lime, basalt, magnetite, sulfur, carbon black, and combinations thereof. Organic fillers may include, for example, lignin, starch, cellulose, cellulose nanoparticles, torrefied biomass, and combinations thereof. Fibers may include, for example, fiberglass, switch grass, coconut hulls, and combinations thereof.

Composites using nanoparticles may also be formed with the biopolymers of the invention. For example, nanocomposite formation by the addition of surface modified clays and/or cellulose nanoparticles is useful in certain applications such as, for example, single-use utensils. Nanoparticles can improve the heat deflection temperature, increase stiffness, provide improved barrier properties, and change water-uptake properties of PLA articles or products.

In embodiments, the invention comprises a method of forming a biopolymer composition. The method includes combining, for example melt-blending, a matrix-forming polylactic acid comprising an essentially pure enantiomer and a tough polyester in a weight-to-weight ratio, for example, from about 1:99 to about 99:1 (e.g., 1:99 to 99:1), or preferably from about 30:70 to about 70:30 (e.g., 30:70 to 70:30), or more preferably from about 45:55 to about 55:45 (e.g., 45:55 to 55:45) to form a polylactic acid matrix. The polylactic acid matrix is then combined, for example melt-blended, with a base polylactic acid comprising an essentially pure opposite enantiomer of the first essentially pure enantiomer of the base polylactic acid, wherein a weight-to-weight ratio of the tough polyester to the matrix-forming polylactic acid is from about 1:99 to about 99:1 (e.g., 1:99 to 99:1), or from about 10:90 to about 90:10 (e.g., 10:90 to 90:10), or from about 30:70 to about 70:30 (e.g., 30:70 to 70:30), or from about 45:55 to about 55:45 (e.g., 45:55 to 55:45), or about 50:50 (e.g., 50:50). Upon combining, the polylactic acid matrix (i.e., the melt-blended product of the matrix-forming polylactic acid and the tough polyester) and the base polylactic acid form a stereocomplex at a weight-to-weight ratio from about 5:95 to about 95:5 (e.g., from 5:95 to 95:5), or from about 10:90 to about 90:10 (e.g., 10:90 to 90:10), or from about 30:70 to about 70:30 (e.g., 30:70 to 70:30), or from about 10:90 to about 30:70 (e.g., 10:90 to 30:70).

In embodiments, various articles of manufacture may be formed with the stereocomplex product of the invention. For example, processes such as extruding, injection molding, fiber forming, sheet forming, blow molding, and thermoforming may be used to create articles including cutlery, spun fibers for incontinence applications and surgical dressings and apparel, containers for packaging and hot server items (e.g., cups for hot or boiling liquids like tea or coffee), hard plastic casings (e.g., computers, car parts, etc.) printable cardstock, key cards, 3-D printed items, and other items. It should be appreciated that a person of ordinary skill the art may select any suitable process to create any article of manufacture from the biopolymer compositions of the invention.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurement. The following examples are intended only to further illustrate the invention and are not intended in any way to limit the scope of the invention as defined by the claims.

EXAMPLES

The biopolymer compositions described herein can be made using techniques well known in the art. Prior to compounding (i.e., the process of melt-blending plastics together and/or with other additives, typically using an extruder), each component of the final biopolymers composition in the following examples was dried at 85° C. overnight in a convection oven. It should be appreciated that a broad range of drying temperatures (e.g., about 50° C. to about 150° C.) may be used to dry the components as determined by a skilled artisan. The final formulations are generally stored with desiccant to avoid damage through moisture absorption. Though any suitable device may be used, the polymer blends were prepared with a twin-screw extruder (e.g., Leistritz, Somerville, N.J., Micro 18 co-rotating twin-screw extruder), which has six heating zones. The temperatures used for blending ranged from about 160° C. to about 190° C. (e.g., 160° C. to 190° C.). The resulting blends were then injection molded using an injection molder (e.g., Boy Machines, Hauppauge, N.Y., 15 S injection molder) into 2" width×4" length×1.5" thickness rectangular samples for testing. The injection molder has three heated zones, where each zone was set at 185° C. Prior to mechanical and thermomechanical testing, the injection molded rectangular samples were stored for 24 h in a desiccator to avoid moisture absorption. The heat deflection temperature curves of the samples were obtained from a thermomechanical analyzer (e.g., TA Instruments, New Castle, Del., thermomechanical analyzer model TMA 2940). Each sample was cut into a rectangular piece with a length of 19 mm, a width of 4.96 mm, and a thickness of 1.56 mm, the required dimensions as specified by the manufacturer of the thermomechanical analyzer. The sample was held at 30° C. for one minute and then the temperature was ramped at 10° C./min up to 200° C. The purpose of holding the sample at 30° C. was to ensure that the internal temperature of the samples prior to the start of the test was the same. Ramping the temperature allowed determination of the samples behavior from 30° C. to 200° C. In general, a plastic will begin to "soften" as its internal temperature is increased. The instrument measured how much the sample "softens," or "deflects," which yielded a heat deflection temperature curve for the sample. From the curve, the temperature at which the sample "softened" or "deflected" was determined.

Example 1

Preparation of polylactic acid matrix. Lapol HDT (obtained from Lapol, LLC, Santa Barbara, Calif. and referred to generally herein as "matrix-forming polylactic acid") was synthesized similar to the procedure disclosed in U.S. Pat. No. 9,139,689. 83.6 g of glycerine, 308.0 g of di(ethylene glycol), 400.4 g of maleic anhydride briquettes, and 3.24 g of Benefos 1680 were charged into a 4 neck reaction vessel with an overhead stirrer, a condenser and collection flask, and a nitrogen purge. The reaction was heated to 100° C. under a nitrogen blanket. After the maleic anhydride briquettes melted and dissolved in the glycerin and di(ethylene glycol) solution, 2.84 g of stannous octoate was added dropwise. The reaction was heated to 165° C. and left to react until the acid number dropped to a range between 80 and 90. The reaction products were poured out. Weight-average molecular weight of the "prepolymer" was in the range of 1,000 to 2,000 Daltons. D-lactide was charged into a glass kettle resin and was heated to 100° C. Once the lactide melted, 1,4-butanediol was added followed by stannous octoate. The reaction was heated to 180° C. under a nitrogen blanket and allowed to react for 2 hours. Then, an appropriate amount of previously synthesized Lapol HDT Prepolymer was added to obtain a copolymer that was comprised of about 90% by weight D-PLA and about 10% by weight Lapol HDT prepolymer. After an hour, the reaction products were poured out. Three different copolymers were obtained with MWs of 13,000, 70,000, and 100,000 Daltons. PBS (obtained from Showa Denko, New York, N.Y. and referred to generally herein as "tough polyester") were first dry mixed (at 55:45 weight % ratio of Lapol HDT:PBS) and then fed into a co-rotating twin-screw extruder to prepare a blend of the composition. The temperature of six heating zones within the extruder were as follows: 165° C., 170° C., 175° C., 180° C., 185° C., and 185° C. from feed to die. The strands were pelletized, with the resulting pellets dried in a convection oven at 85° C. for 2 hours prior to blending with commercially available PLLA (referred to generally herein as "base polylactic acid").

Preparation of stereocomplex. Lapol HDTP (i.e., polylactic acid matrix—Lapol HDT and PBS as above) and Ingeo Biopolymer 4032D (a PLLA product from Cargill, Inc. via its subsidiary NatureWorks, LLC, Minnetonka, Minn.) were first dry mixed (at 10:90 and 20:80 weight % ratio of Lapol HDTP:PLLA) and then fed into a corotating twin-screw extruder to prepare the blend. The temperature of the six heating zones were as follows: 168° C., 173° C., 178° C., 185° C., 183° C., 183° C. from feed to die. After pelletizing the strands, the resulting blend was fed into an injection molder which has three heated zones, with each zone set at 185° C. The mold temperature was held at 55° C. The injection molded part was cut to provide a sample for heat deflection temperature testing using a thermomechanical analyzer (results illustrated in FIG. 1). For comparison, data for unmodified Ingeo Biopolymer 4032D is also shown in FIG. 1. Table 1 summarizes the average data and standard deviation for five samples tested for the modulus, strength, and toughness for PLA (Ingeo Biopolymer 4032D) and stereocomplexes formed with Ingeo Biopolymer 4032D.

TABLE 1

Summary of flexural properties of PLLA,
10% HDTP blend, and 20% HDTP blend

| Flexural Properties | 4032D | 10% Lapol HDTP | 20% Lapol HDTP |
|---|---|---|---|
| Modulus (MPa) | 2800 ± 67 | 2388 ± 150 | 4625 ± 370 |
| Strength (MPa) | 90 ± 15 | 92 ± 5 | 131 ± 2 |
| Toughness (MPa) | 0.89 ± 0.2 | 1.44 ± 0.25 | 1.53 ± 0.1 |

Example 2

Preparation of stereocomplex. Lapol HDTP (i.e., polylactic acid matrix—Lapol HDT and PBS as above) and Ingeo Biopolymer 3001D (a PLLA product from Cargill, Inc. via its subsidiary NatureWorks, LLC, Minnetonka, Minn.) were first dry mixed (at 10:90 and 20:80 weight % ratio of Lapol HDTP:PLLA) and then fed into a corotating twin-screw extruder to prepare the blend. The temperature of the six heating zones were as follows: 168° C., 173° C., 178° C., 185° C., 183° C., 183° C. from feed to die. After pelletizing the strands, the resulting blend was fed into an injection molder which has three heated zones, with each zone set at 185° C. The mold temperature was held at 55° C. The injection molded plasticware was prepared, specifically a single-use fork and knife set. The fork was cut to provide a sample for heat deflection temperature testing using a thermomechanical analyzer (results illustrated in FIG. 2). For comparison, data for unmodified Ingeo Biopolymer 3001D (labeled "PLA") is also shown in FIG. 2. Table 2 summarizes the average data and standard deviation for five samples tested for modulus, strength, and toughness for PLA (Ingeo Biopolymer 3001D) and stereocomplexes formed with Ingeo Biopolymer 3001D.

TABLE 2

Summary of flexural properties of PLLA,
10% HDTP blend, and 20% HDTP blend

| Flexural Properties | 3001D | 10% Lapol HDTP | 20% Lapol HDTP |
|---|---|---|---|
| Modulus (MPa) | 2512 ± 50 | 4198 ± 155 | 4091 ± 300 |
| Strength (MPa) | 112 ± 20 | 152 ± 10 | 131 ± 3 |
| Toughness (MPa) | 0.721 ± 0.3 | 0.650 ± 0.2 | 0.945 ± 0.1 |

These examples demonstrate that the mechanical properties of articles including the biopolymer composition of the invention and/or formed with the method of the invention result in surprisingly improved mechanical properties, such as modulus, strength, and toughness. It was also unexpectedly discovered that these mechanical properties were created and maintained in the absence of an annealing process, which is generally used in the art to achieve crystallinity levels leading to improved mechanical properties.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments and characteristics described herein and/or incorporated herein. In addition the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 30%, preferably by as much as 20%, and more preferably by as much as 10% to a reference quantity, level, value, or amount.

The term "consisting essentially of" excludes additional method (or process) steps or composition components that substantially interfere with the intended activity of the method (or process) or composition. This term may be substituted for inclusive terms such as "comprising" or "including" to more narrowly define any of the disclosed embodiments or combinations/sub-combinations thereof. Furthermore, the exclusive term "consisting" is also understood to be substitutable for these inclusive terms.

"Optional" or "optionally" means that the subsequently described event or circumstance may or may not occur, and that the description includes instances in which said event or circumstance occurs and instances where it does not. For example, the phrase "optionally comprising a defoaming agent" means that the composition may or may not contain a defoaming agent and that this description includes compositions that contain and do not contain a foaming agent.

By the term "effective amount" of a compound or property as provided herein is meant such amount as is capable of performing the function of the compound or property for which an effective amount is expressed. As is pointed out herein, the exact amount required will vary from process to process, depending on recognized variables such as the compounds employed and various internal and external conditions observed as would be interpreted by one of ordinary skill in the art. Thus, it is not possible to specify an exact "effective amount," though preferred ranges have been provided herein. An appropriate effective amount may be determined, however, by one of ordinary skill in the art using only routine experimentation.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims. Although any methods and materials similar or equivalent to those described herein can be used in the practice or testing of the present invention, the preferred methods and materials are herein described. Those skilled in the art may recognize other equivalents to the specific embodiments described herein which equivalents are intended to be encompassed by the claims attached hereto.

The claimed invention is:

1. A biopolymer composition comprising:
   a base polylactic acid comprising an essentially pure enantiomer comprised of L-lactyl monomeric units and having a number average molecular weight from about 50,000 Da to about 2,000,0000 Da;
   a matrix-forming polylactic acid comprising an essentially pure opposite enantiomer of the essentially pure enantiomer of the base polylactic acid comprised of D-lactyl monomeric units and having a number average molecular weight from about 500 Da to about 500,000 Da which is lower than the number average molecular weight of the base polylactic acid;
   a tough polyester having a number average molecular weight range from about 2,000 Da to about 500,000 Da and a glass transition temperature from about −75° C. to about 40° C.;
   wherein the base polylactic acid, the matrix-forming polylactic acid, and the tough polyester comprise a blend which is an immiscible blend and not a copolymer of the base polylactic acid, the matrix-forming polylactic acid, and the tough polyester;
   wherein the matrix-forming polylactic acid and the tough polyester have a weight-to-weight ratio from about 1:99 to about 99:1 to form a polylactic acid matrix; and
   wherein the polylactic acid matrix and the base polylactic acid form a stereocomplex when melt blended at a weight-to-weight ratio from about 10:90 to about 90:10.

2. The biopolymer composition of claim 1, wherein the base polylactic acid has a number average molecular weight from about 50,000 Da to about 300,000 Da.

3. The biopolymer composition of claim 1, wherein the tough polyester is selected from the group consisting of: polybutylene-adipate-co-terephthalate, polybutylene succinate, and combinations thereof.

4. The biopolymer composition of claim 1, wherein the tough polyester includes monomeric units selected from the group consisting of: diol monomeric units, diacid monomeric units, and combinations thereof.

5. The biopolymer composition of claim 1, wherein the tough polyester is prepared via polycondensation of diol and diacid monomeric units and optionally catalyzed by a catalyst selected from the group consisting of: acid catalysts, organometallic catalysts, earth metal catalysts, and combinations thereof.

6. The biopolymer composition of claim 5, wherein the earth metal catalyst is selected from the group consisting of: stannous chloride, stannous octanoate, titanium chloride, lanthanum chloride, and combinations thereof.

7. The biopolymer composition of claim 1, wherein the tough polyester has a glass transition temperature from about −20° C. to about 20° C.

8. The biopolymer composition of claim 1, wherein the matrix-forming polylactic acid and the tough polyester are melt-blended in a weight-to-weight ratio from about 30:70 to about 70:30 to form the polylactic acid matrix.

9. The biopolymer composition of claim 1, wherein the matrix-forming polylactic acid has a melting temperature from about 150° C. to about 250° C.

10. The biopolymer composition of claim 1, wherein the weight-to-weight ratio of the polylactic acid matrix and the base polylactic acid that forms the blend when melt-blended is adjusted by increasing the amount of the tough polyester in the polylactic acid matrix to cause an increase in toughness in a product formed from the blend.

11. The biopolymer composition of claim 1, wherein the weight-to-weight ratio of the polylactic acid matrix and the base polylactic acid that forms the blend when melt-blended is adjusted by decreasing the amount of the tough polyester in the polylactic acid matrix to cause an increase in heat resistance in a product formed from the blend.

12. The biopolymer composition of claim 1, wherein the blend has a toughness from about 1.40 MPa to about 5.00 MPa.

13. The biopolymer composition of claim 1, wherein the blend has a toughness greater than at least about 2.00 MPa.

14. The biopolymer composition of claim 1, further comprising a component selected from the group consisting of: minerals; organic fillers; fibers including organic, inorganic, or manufactured fibers; agricultural waste streams; and combinations thereof.

15. The biopolymer composition of claim 14, wherein the minerals are selected from the group consisting of: clays, surface modified clays, talc, calcium carbonate, gypsum, lime, basalt, magnetite, sulfur, carbon black, and combinations thereof.

16. The biopolymer composition of claim 14, wherein the organic fillers are selected from the group consisting of: lignin, starch, cellulose, cellulose nanoparticles, torrefied biomass, and combinations thereof.

17. The biopolymer composition of claim 14, wherein the fibers are selected from the group consisting of: fiberglass, switch grass, coconut hulls, and combinations thereof.

18. The biopolymer composition of claim 1, wherein the base polylactic acid has a number average molecular weight from about 50,000 Da to about 150,000 Da.

19. The biopolymer composition of claim 1, wherein the base polylactic acid has a number average molecular weight from about 120,000 Da to about 150,000 Da.

20. The biopolymer composition of claim 1, wherein the matrix-forming polylactic acid and the tough polyester are melt-blended in a weight-to-weight ratio from about 30:70 to about 70:30.

21. The biopolymer composition of claim 1, wherein the matrix-forming polylactic acid and the tough polyester are melt-blended in a weight-to-weight ratio from about 45:55 to about 55:45.

22. The biopolymer composition of claim 1, wherein the matrix-forming polylactic acid and the tough polyester are melt-blended in a weight-to-weight ratio from about 45:55 to about 55:45.

* * * * *